United States Patent [19]

Berg et al.

[11] Patent Number: 5,628,473
[45] Date of Patent: May 13, 1997

[54] METHODS OF AND APPARATUS FOR APPLYING STRANDS TO A SUPPORT

[75] Inventors: Jerome S. Berg, Memphis; Jeffrey A. Wessell, Cordova, both of Tenn.; John P. Slocum, Taylors, S.C.

[73] Assignee: Emhart Inc., Newark, Del.

[21] Appl. No.: 161,947

[22] Filed: Dec. 3, 1993

[51] Int. Cl.$^6$ ........................................... B65H 54/02
[52] U.S. Cl. ................... 242/444; 242/447.1; 242/448.1
[58] Field of Search .................... 242/7.21, 7.22, 242/7.23, 444, 447.1, 448.1

[56] References Cited

U.S. PATENT DOCUMENTS

| | | |
|---|---|---|
| 601,161 | 3/1898 | Pain . |
| 785,321 | 3/1905 | McLaughlin . |
| 1,620,844 | 3/1927 | Walker . |
| 1,955,489 | 4/1934 | Duncan et al. . |
| 3,082,134 | 3/1963 | Wentz . |
| 3,084,087 | 4/1963 | Weil et al. . |
| 3,378,427 | 4/1968 | McClean . |
| 3,496,047 | 2/1970 | Kasten . |
| 3,708,132 | 1/1973 | Lang ..................... 242/7.23 |
| 3,730,795 | 5/1973 | Medney et al. . |
| 3,935,801 | 2/1976 | Okazaki . |
| 3,940,073 | 2/1976 | Hauesler et al. ............ 242/7.23 |
| 4,010,054 | 3/1977 | Bradt ..................... 242/7.22 |
| 4,029,265 | 6/1977 | Piper ..................... 242/7.23 |
| 4,089,727 | 5/1978 | McLain . |
| 4,251,036 | 2/1981 | McLain ................... 242/7.21 |
| 4,367,189 | 1/1983 | Davies . |
| 4,799,987 | 1/1989 | Sullins ................... 242/7.21 |
| 5,047,104 | 9/1991 | Preis et al. . |
| 5,064,129 | 11/1991 | Hsu ..................... 242/7.23 |

*Primary Examiner*—Katherine Matecki
*Attorney, Agent, or Firm*—E. D. Murphy

[57] ABSTRACT

An apparatus (28) facilitates application of one or more strands (24) onto a mandrel (20) which is mounted for rotation. The apparatus (28) includes a frame structure (30) which supports a confining device (46) and a receptacle (48) for receiving opposite ends of the mandrel (20) in a non-gripping manner. The frame structure (30) further supports a guide frame (80) which is positioned for movement along and parallel to the mounted mandrel (20) and which guides the strands (24) onto the rotating mandrel. A pair of strands (24) may be applied to opposite sides of the mandrel (20) to balance pulling forces which result in the mandrel due to tension on the strands. Ends (143) and (145) of a pin (142) extend laterally of the mandrel axis at one end of the mandrel (20) and are insertible into slots (126), (128), (134) and (136) formed in a coupler (116) of the confining device (46) to facilitate mounting of the mandrel with the confining device.

18 Claims, 7 Drawing Sheets

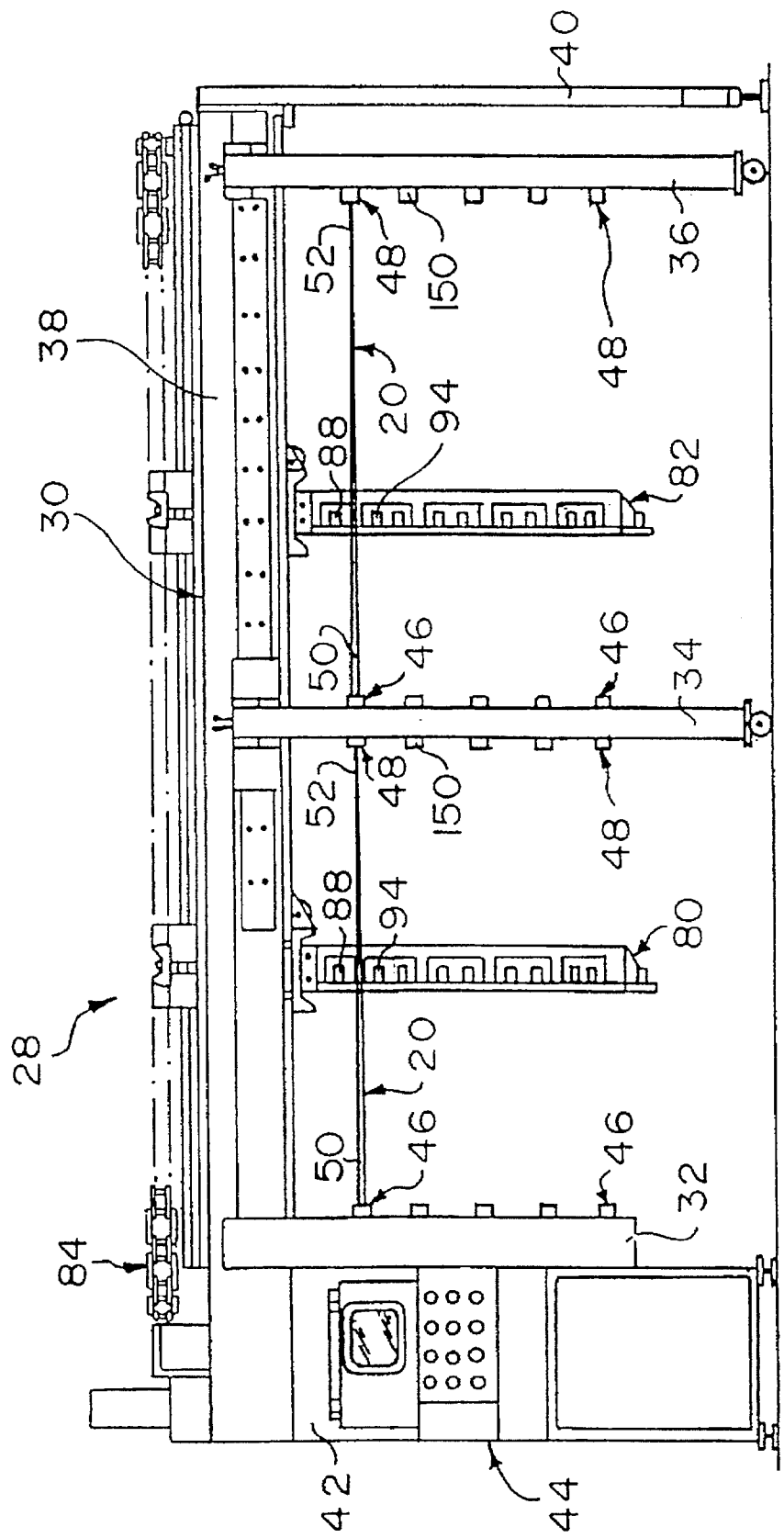

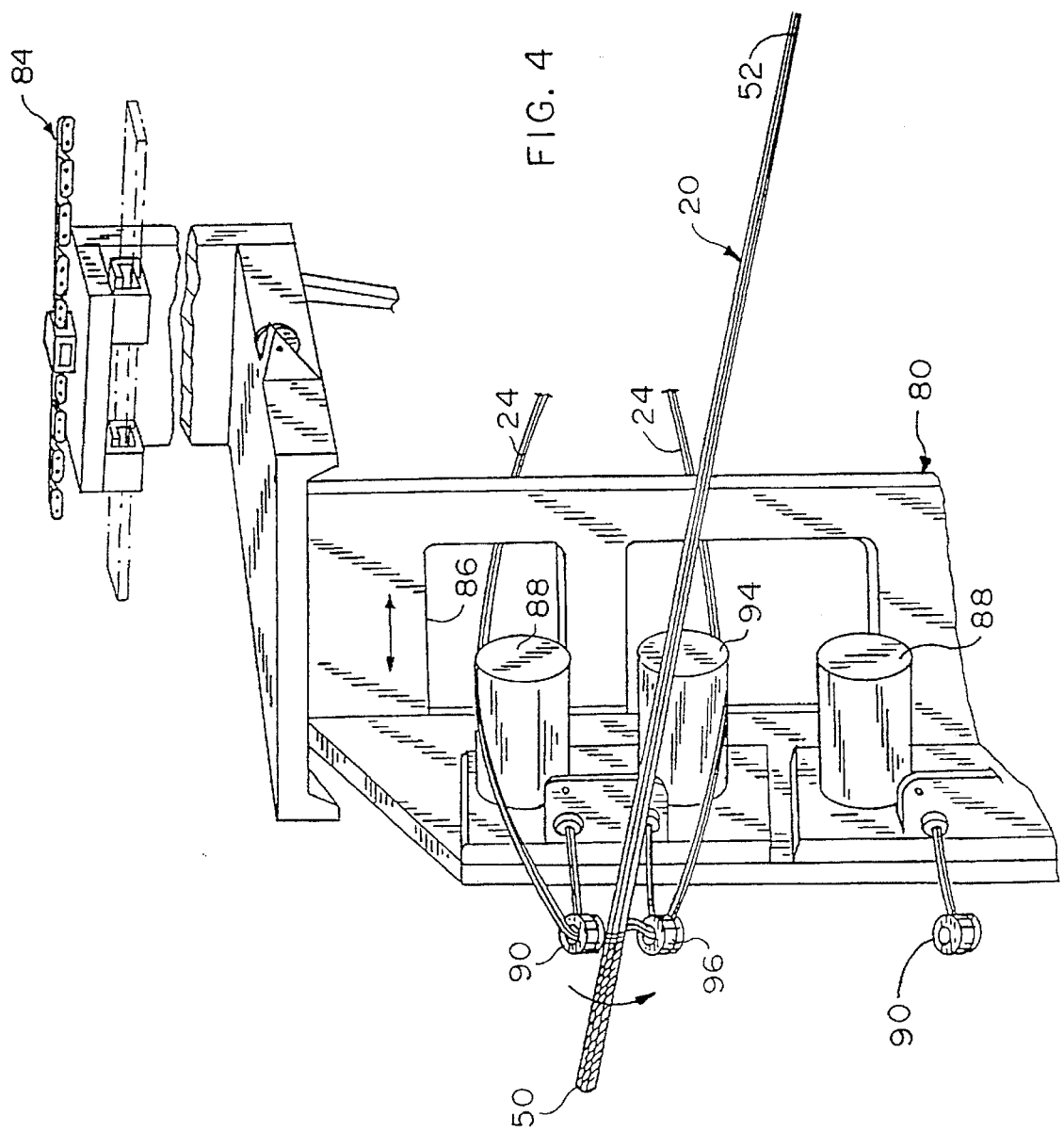

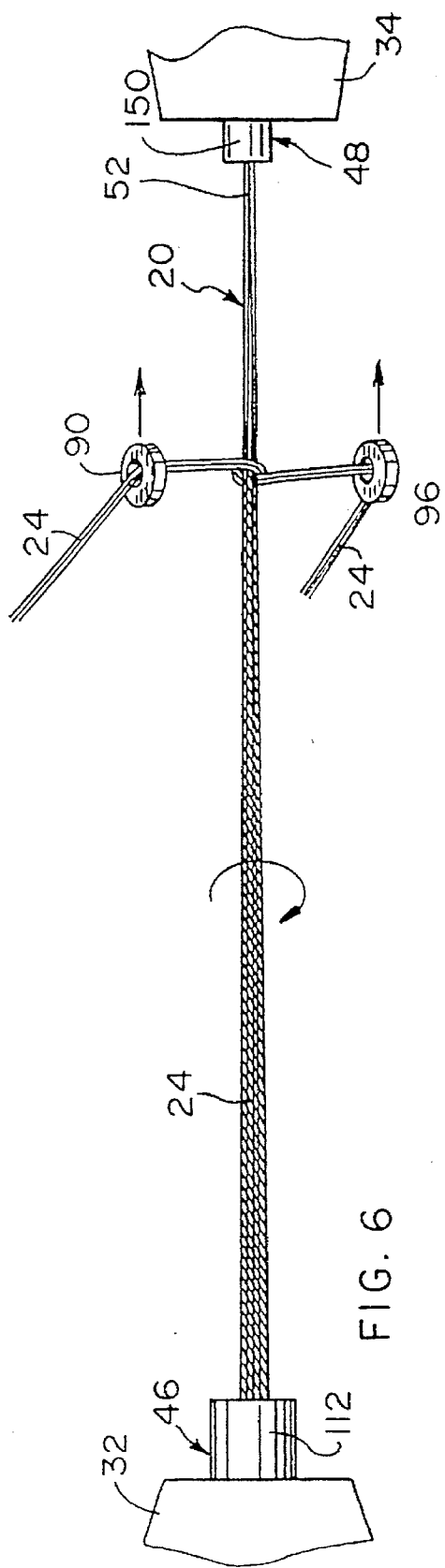
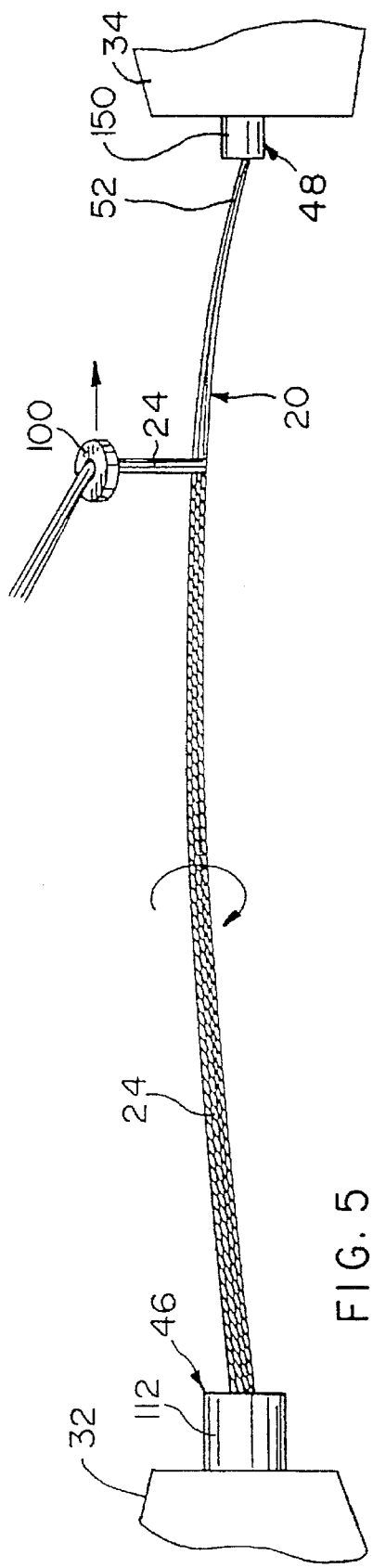

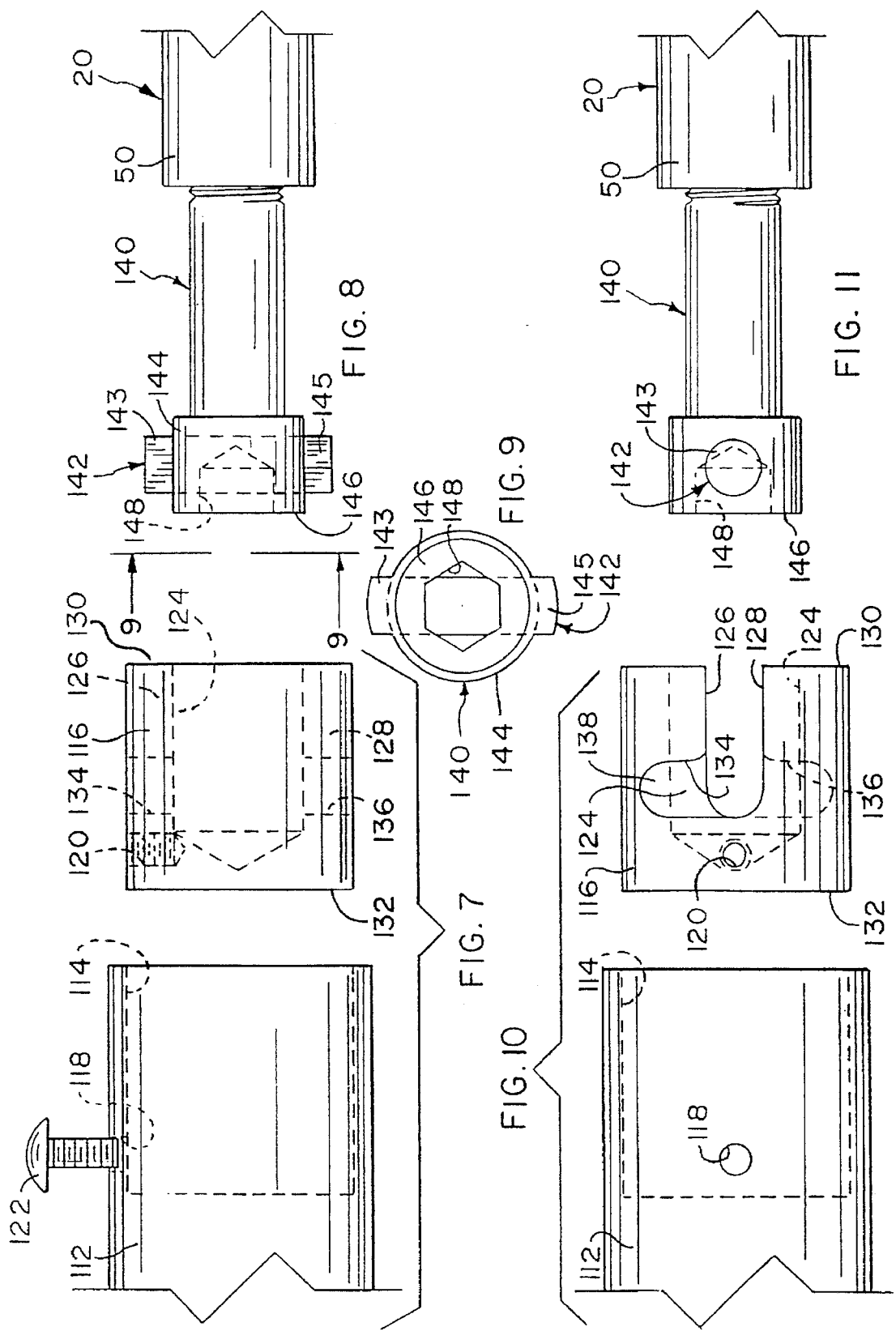

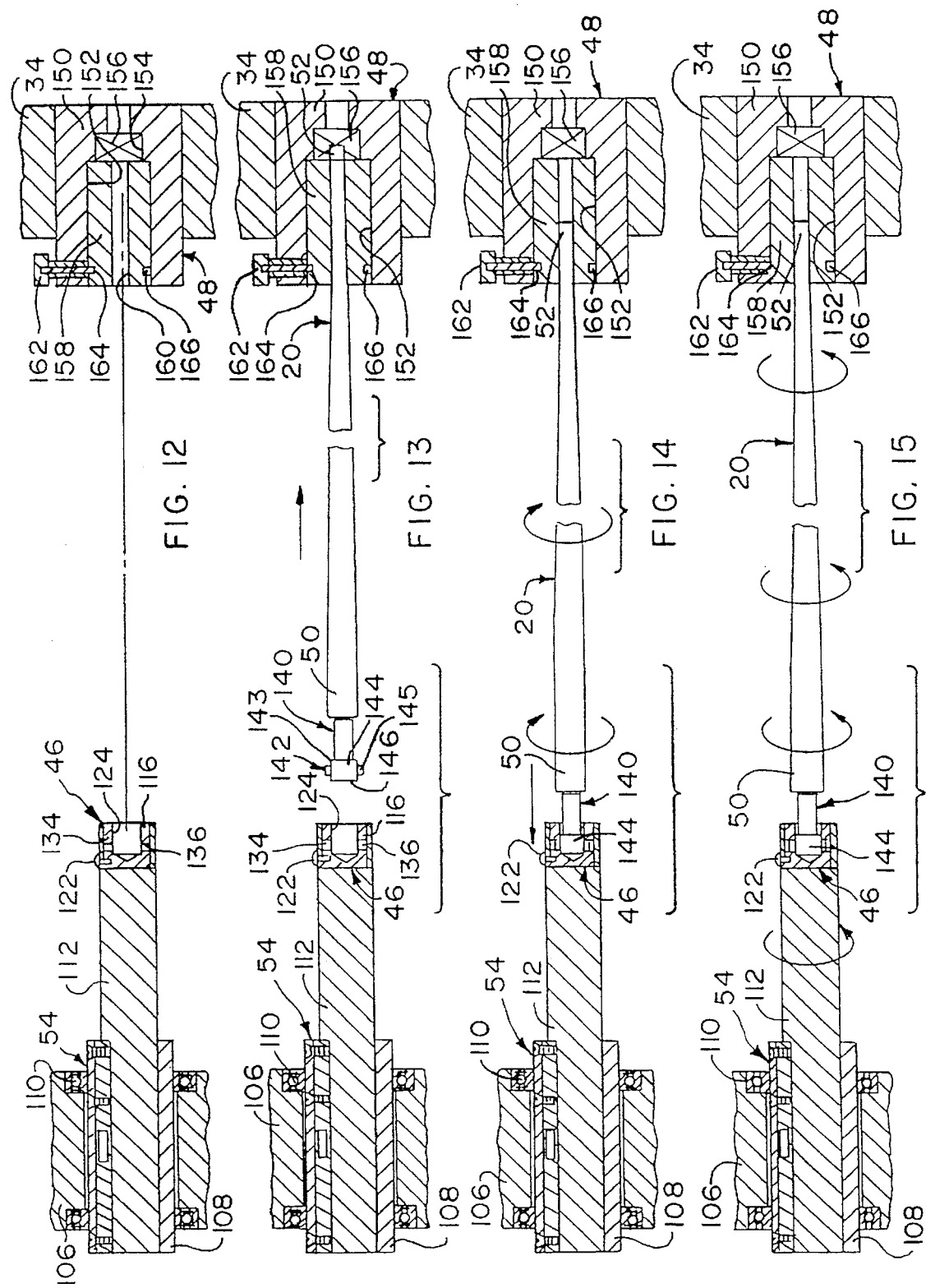

METHODS OF AND APPARATUS FOR APPLYING STRANDS TO A SUPPORT

BACKGROUND OF THE INVENTION

This invention relates to methods of and apparatus for applying strands to a support and particularly relates to methods of and apparatus for applying resin-treated multiple-fiber strands to a mandrel mounted for receipt of strands.

In one process for manufacturing products having hollow shafts, such as shafts for golf clubs, fishing rods and the like, strands of multiple fibers are passed through a bath containing a resin. The resin-treated strands are eventually wrapped onto a mandrel of small diameter which defines the core size and shape of the ultimate shaft and provides support for the wrapped strands during a curing process. After the resin has cured, the mandrel is removed from assembly with the cured product to provide the shaft.

In some instances, the mandrel is a solid shaft of definitive length and tapers from one end to the other. Thus, the resulting product will be hollow when the mandrel is removed and the product will be tapered in accordance with the taper of the mandrel. In other instances, the solid mandrel may be of uniform diameter from one end to the other whereby the core size or diameter of the resulting product is also of uniform diameter.

When preparing for the strand wrapping process, the solid mandrel is typically mounted into an apparatus where one end of the mandrel is gripped, for example, within a rotatable chuck, and the opposite end is gripped or is centered on a dead spindle. In any event, the mandrel is mounted at opposite ends thereof in such a manner that axially compressive forces are applied to the mandrel from opposite ends thereof. The strand is passed through a head which is mounted for movement relative to and generally in a path parallel to the axis of the mandrel which is rotated through the rotatable chuck.

The lead end of the strand is attached to the mandrel and the head is moved along the mandrel while the mandrel is rotated whereby the strand is wrapped onto the mandrel in a helical pattern from one end of the mandrel to the other. Adjustment of the linear speed of the head and/or the rotational speed of the mandrel allows for selection of the angle of the helical wrapping.

The application of compressive forces at the ends of the mandrel as noted above causes the mandrel of small diameter to bow from its at-rest linear axial position. This causes the angle of the helical wrapping to vary as the head moves from one end of the mandrel to the other.

In an attempt to resolve the problem of bowing of the mandrel, the one end of the mandrel which was assembled with the dead spindle is mounted in a gripping device which applies a tensile load to that end of the mandrel. This tensioning force tends to pull the mandrel along its axis and attempts to hold the mandrel in a linear axial state consistent with its at-rest axial state while the strand is being wrapped onto the mandrel. In mass manufacturing processes utilizing the tensile-load technique, the time for loading and unloading the mandrels is increased in comparison to the technique in which only one end is gripped. Consequently, while the tensile-load technique appears to be a solution to the problem of mandrel bowing, it increases the cost of manufacture and decreases the volume of product capable of being made within a defined period.

Thus, there is a need for methods of and apparatus for facilitating the manufacture of shafts while avoiding the above-noted mandrel-mounting problems associated with the bowing of the mandrel and the expensive and time-consuming tensile-load technique.

SUMMARY OF THE INVENTION

It is, therefore, an object of this invention to provide methods of and apparatus for facilitating the wrapping of strands onto a support in a desired fashion and in a relatively inexpensive manner.

Another object of this invention is to provide methods of and apparatus for facilitating the wrapping of strands onto a support while avoiding the undesirable lateral bowing of the support during the period when the strands are being applied to the support.

Still another object of this invention is to provide, in a strand-wrapping process, an apparatus which facilitates the loading and unloading of a support relative to the apparatus in a relatively inexpensive and efficient manner.

With these and other objects in mind, this invention contemplates an apparatus for applying strands to a support which includes a first guide structure for guiding a first strand onto the support from a first direction, a second guide structure for guiding a second strand onto the support from a second direction, a first tension-developing facility coupled to the first strand for developing a force through the first strand which tends to pull the support laterally of its axis, a second tension-developing facility coupled to the second strand for developing a force through the second strand which tends to pull the support laterally of its axis and frame structure for supporting the first guide structure and the second guide structure at locations relative to each other which allow the pulling forces of each of the first and second guide structures to effectively cancel each other so that the support is precluded from movement lateral of its axis.

This invention further contemplates an apparatus for mounting a support which includes a confining structure, an insert structure on a first portion of the support for assembly with the confining device in a non-gripping manner and a receptacle for receipt, in a non-gripping manner, of a second portion of the support spaced from the first portion thereof.

This invention also contemplates a method of applying strands to a support having a normally linear axis which includes the steps of attaching strands to a support mounted for rotation and then moving the strands along the rotating support. Tensions are developed in the strands which tend to pull the support laterally of its axis. To counter these pulling forces, the strands are applied to the support from different directions to the extent that the forces effectively cancel each other.

This invention additionally contemplates a method of mounting a support in an apparatus which includes the steps of forming a tab on a first portion of the support extending at an angle from the axis of the support. The tab is positioned, in a non-gripping manner, into a first slot formed in a coupler and then into a second slot formed in the coupler where the second slot is in communication with and at an angle with the first slot. A second portion of the support spaced from the first portion thereof is positioned into an opening in a receptacle in a non-gripping manner.

BRIEF DESCRIPTION OF THE DRAWINGS

In the accompanying drawings:

FIG. 3 is a front view of a frame structure which includes facilities for supporting a plurality of mandrels and for guiding the strands through a guide head and onto each of the mandrels while the mandrels are being rotated and the heads are being moved in a path parallel to axes of the mandrels;

FIG. 4 is a partial perspective view of a portion of the guide head showing the application of two strands onto the mandrel in accordance with certain principles of the invention;

FIG. 5 is a side view showing the wrapping of a single strand onto the mandrel with a slight bow in the direction from which the strand is being fed;

FIG. 6 is a side view showing the application of two strands from different directions onto the mandrel to maintain the mandrel in a desired horizontal axial orientation in accordance with certain principles of the invention;

FIG. 7 is a side view of drive shaft and insert which, when assembled, provide a drive coupling for coupling one end of the mandrel thereto in accordance with certain principles of the invention to provide rotational movement of the mandrel;

FIG. 8 is a side view of one end of the mandrel with a cap screw mounted axially therein and with a pin located through and extending from opposite sides of a head of the screw to facilitate assembly of the mandrel with the drive coupling of FIG. 7 in accordance with certain principles of the invention;

FIG. 9 is an end view showing a socket formed in the free end of the head of the screw of FIG. 8 and with the pin extending from opposite sides of the head;

FIG. 10 is a top view of the drive shaft and insert of FIG. 7 showing a slot configuration formed internally of the insert in accordance with certain principles of the invention to facilitate receipt of the pin and screw head of FIG. 8 therein;

FIG. 11 is a top view of the mandrel end and cap screw of FIG. 8;

FIG. 12 is a sectional view showing the drive coupling of FIG. 7 in assembly with a portion of a drive system for imparting rotational movement to the mandrel and further showing a receptacle in assembly with the frame structure of FIG. 3 and in axial alignment with the drive coupling of FIG. 7;

FIG. 13 is a sectional view showing the elements of FIG. 12 with the screwless end of the mandrel being inserted into the receptacle in accordance with certain principles of the invention;

FIG. 14 is a sectional view showing the elements of FIG. 12 with the pin and cap of FIGS. 8 and 9 being positioned within the slots of the insert of FIG. 10 whereafter the mandrel is partially rotated to complete the assembly of the mandrel with the drive coupling and receptacle in accordance with certain principles of the invention; and FIG. 15 is a sectional view showing the elements of FIG. 12 with the drive system rotating the mandrel to facilitate the wrapping of the strands onto the mandrel.

DETAILED DESCRIPTION OF THE INVENTION

Figure 1:
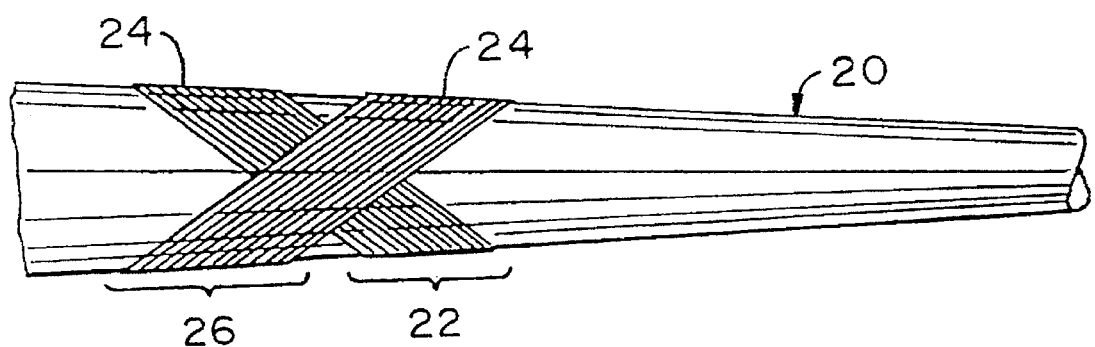
FIG. 1 is a partial side view of a mandrel with strands wrapped around portions thereof representing a helical angle of the strands which are wrapped from different directions along the mandrel.

Referring to FIG. 1, a portion of a tapered mandrel 20 has wound thereon a first layer 22 of fibrous strands 24 with a helix angle as illustrated. A second layer 26 of the strands 24 with a different helix angle is shown as a overlay over the first layer 22. The illustration of FIG. 1 is merely representative of two layers or wrappings of the finished product (not shown) wherein multiple helically wrapped layers of the strands 24 are applied to the mandrel 20. It is noted that the mandrel 20 is composed of a metal such as, for example, steel and is of a finite length, typically within a range of forty to sixty inches. The mandrel 20 is uniformly tapered from one end thereof to the other end wherein a large-diameter end 50 (FIG. 13) has a diameter within a range of 0.4 to 0.6 inch and a small-diameter end 52 (FIG. 13) has a diameter within a range of 0.1 to 0.2 inch. Thus, while the mandrel 20 is of considerable length, it is very slender and subject to bowing.

Each of the strands 24 is formed by a plurality of fibers which have been treated with a resin, such as, for example, a thermosetting material and blended together as a stranded product. The fibers, for example, could be composed of carbon or glass fiber. However, for the purposes of the description herein, each of the strands 24 could be solid rather than fibrous.

Figure 2:
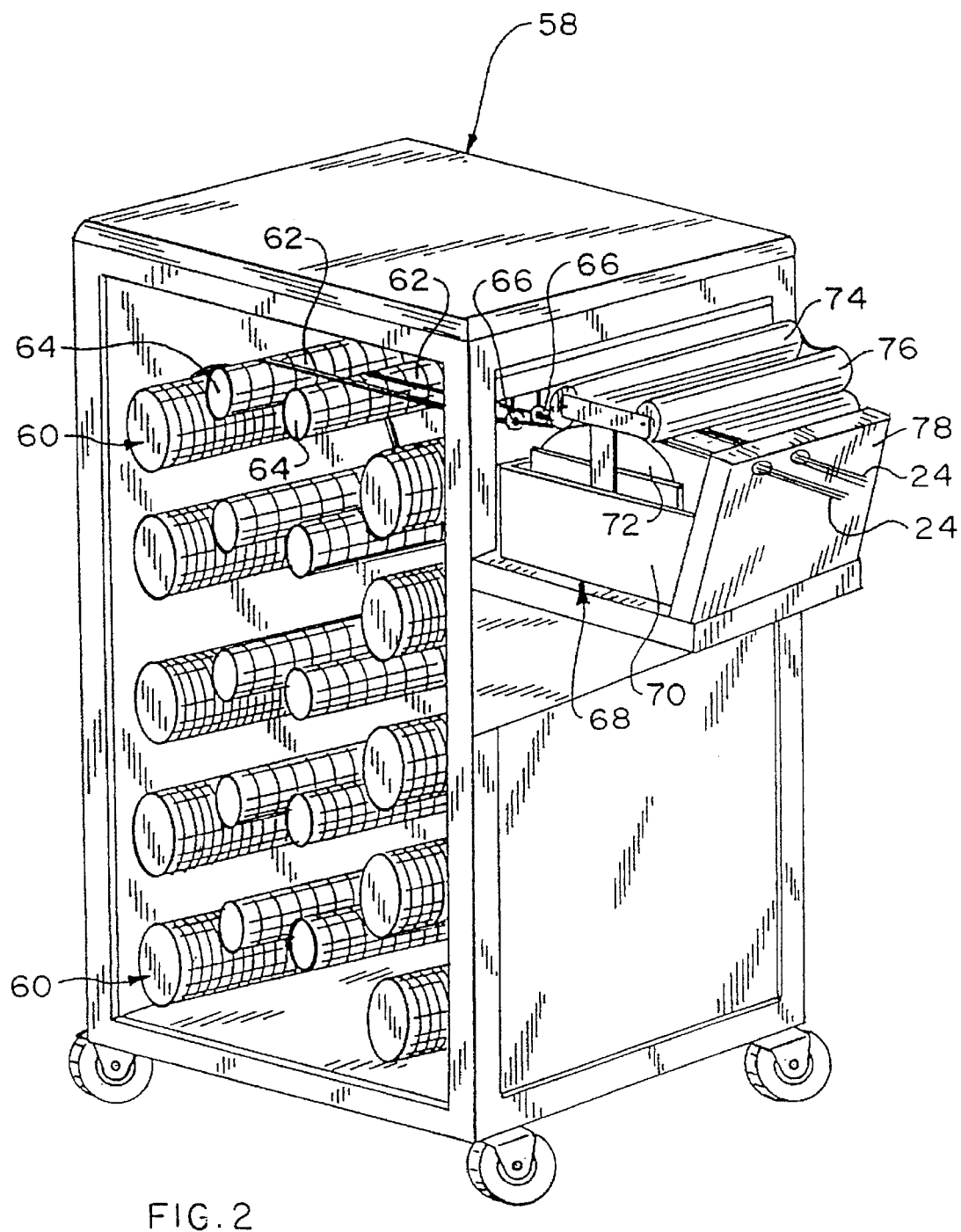
FIG. 2 is a perspective view showing a creel and a plurality of spools of fibrous strands supported therein and further shows a resin-applying facility attached to the side of the creel through which the strands are drawn.

In the manufacture of the end product which includes the strands 24 wrapped on the mandrel 20, an apparatus 28 for applying the strands to the mandrel is illustrated in FIGS. 2 and 3. Referring specifically to FIG. 3, apparatus 28 includes a frame structure 30 having three columns 32, 34 and 36 assembled with and extending downwardly from a horizontal support 38 which, in turn, is supported by support columns 40 and 42 at opposite ends of the support 38. Control and power facilities 44 are located adjacent column 42.

A plurality of confining devices 46 are mounted on one side of column 32 and one side of column 34. A plurality of receptacles 48 are located on the other side of column 34 and on one side of column 36. Each of the confining devices 46 is aligned axially with a respective one of the receptacles 48 such that there are ten sets of confining devices and receptacles as shown in FIG. 3. As further illustrated in FIG. 3, a first of the mandrels 20 has its large-diameter end 50 mounted in the uppermost confining device 46 associated with column 32 and its small-diameter end 52 mounted in the uppermost receptacle 48. Other mandrels 20 could be mounted between the nine other sets of confining devices 46 and receptacles 48, such as is illustrated in the uppermost set between columns 34 and 36, to obtain the maximum benefit of apparatus 28 in the manufacture of strand-wrapped mandrels.

Each of the columns 32 and 34 contain drive mechanisms 54 (FIG. 12), such as, for example, the type of mechanism used in a typical lathe drive mechanism, for rotatably driving the confining devices 46. Also, rollers 56 are mounted on the underside of columns 34 and 36 so that the columns can be adjusted relative to the horizontal support 38 to accommodate mandrels 20 of different lengths.

As shown in FIG. 2, a creel 58 supports a plurality of spools 60 of untreated fibers 62 which form the strands 24. Each of the spools 60 is mounted on a support (not shown) which is coupled to an air clutch (not shown). Each air clutch is adjusted to an air pressure level which is near zero and provides only slight tension on the fibers 62 being drawn from the spool. The untreated fibers 62 are drawn from the respective spools 60 and are passed over stationary guide rolls 64, through guide eyelets 66 mounted within the creel 58 and through a resin applying facility 68 mounted externally of the creel. The resin applying facility 68 includes a resin bath container 70, a large roller 72 and two small rollers 74 and 76. The roller 72 is rotated within a liquid resin bath within the bath container 70 and carries some of the resin to the top of the large roller in the vicinity of the small rollers 74 and 76. The untreated fibers 62 are passed between the large roller 72 on the underside of the fibers and the small rollers 74 and 76 on the upperside of the fibers whereby the fibers are coated with the resin. The resin-coated fibers 62 now become the strands 24 which are passed through apertures in a panel 78 adjacent the container 70.

As further shown in FIG. 3, and in greater detail in FIG. 4, two identical guide frames 80 and 82 are included within the frame structure 30. Each of the frames 80 and 82 is coupled to a chain drive system 84 located above and beyond the horizontal support 38. Operation of the chain drive system 84 facilitates lateral travel of the frames 80 and 82 such that frame 80 travels between columns 32 and 34 and frame 82 travels between columns 34 and 36.

It is to be understood that frames 80 and 82 are identical and function in an identical manner. In the following description of the operation of apparatus 28, only frame 80 will be noted, it being understood that frame 82 functions in the same manner.

As shown in FIG. 4, the leading end of an upper one of the strands 24 is passed through an opening 86 in the frame 80, over and in engagement with a smooth-surfaced, highly polished guide 88, through an eyelet 90 and in position for wrapping the strand onto the mandrel 20. The leading end of a lower one of the strands 24 is passed through an opening 92 in the frame 80, under and in engagement with a smooth-surfaced, highly polished guide 94, through an eyelet 96 and in position for wrapping the strand onto the mandrel 20. As shown, the eyelets 90 and 96 are located on diametrically opposite sides of the mandrel 20.

Initially, the guide frame 80 is located adjacent the large end 50 of the mandrel 20 which is mounted, but not gripped, in the related confining device 46 (FIG. 14). Also, the small end 52 of the mandrel 20 is located in the receptacle 48 (FIG. 14) but also is not gripped therein as described hereinafter. Thereafter, the leading ends of the upper and lower strands 24 are secured to the large end 50 of the mandrel 20. The drive mechanism 54 is then operated to rotate the mandrel 20 about its axis between the confining device 46 and the receptacle 48. At the same time, the chain drive 84 facilitates linear movement of the guide frame 80 along the length of the mandrel 20, from left to right as viewed in FIGS. 3 and 4. In this manner, the two sets of strands 24 are wrapped in helical fashion about the mandrel as further illustrated in FIG. 6.

If desired, a single strand 24 can be passed through a single eyelet 100 and wrapped onto the mandrel 20 in a manner illustrated in FIG. 5 instead of the two-strand process described above. The single-strand process, which has been used in the past and continues to be used, develops a slight bow as illustrated in FIG. 5 which, in some instances, is acceptable.

In the above-described two-strand process for applying two strands 24 on opposite sides of the mandrel 20, essentially equal levels of tension are applied to each strand by resistance imparted to the strands through a combination of elements such as, for example, the air clutches, guide rolls 64, eyelets 66, resin applying facility 68, guides 88 and 94 and eyelets 90 and 96. The essentially equal tension developed in the strands 24 is applied directly to opposite sides of the mandrel 20 as shown in FIG. 6. This balances the reverse or pulling forces applied to the mandrel 20 through the strands 24 and eliminates deformations which may otherwise occur in the mandrel when applying strands thereto.

It is noted that, in addition to the two-strand process, additional strands 24 could be applied to the mandrel 20 from different directions in order to effect the balance of forces applied to the mandrel and thereby prevent deformations therein. Such multiple strand application greater than two strands would be captured within the spirit and scope of this invention.

As illustrated in FIG. 12, the drive mechanism 54 includes a stationary support 106 within which a drive member 108 is supported by bearings 110 for rotation relative to the support. A drive shaft 112 is keyed to the drive member 108 for driving rotation therewith in the manner of the drive of the headstock of a conventional lathe.

The shaft 112 is contained within columns 32 and 34 (FIG. 3) and provides a mounting for the confining device 46 which extends from the columns. As shown in FIG. 7, the free end of the drive shaft 112 is formed with an axial opening 114 which is shaped to receive therein a drive coupling 116 of the confining device 146. A side portion of the shaft 112 is formed with a through hole 118 which extends into communication with the opening 114. When the coupling 116 is positioned in opening 114, a threaded hole 120, which is formed in a side portion of the coupling, is aligned with the through hole 118 whereafter a screw 122 is used to secure the coupling within the opening of the shaft.

The coupling 116 is formed with an axial opening 124 and a pair of opposed axially-directed slots 126 and 128 on diametrically opposite sides of the opening. The slots 126 and 128 are formed through the peripheral sides thereof and in communication with the opening 124 as viewed in FIGS. 7 and 10. The slots 126 and 128 extend in a direction inwardly of the coupling 116 from an end face 130 thereof and parallel to the axis of the coupling. The inboard end of the slots 126 and 128 terminate at a distance slightly more than one-half the length of the coupling between the end face 130 and an end face 132.

A pair of lateral slots 134 and 136 are formed in generally diametrically opposite sides of the coupling 116 generally laterally of the axis thereof and extend through the peripheral side of the coupling. One end of the slots 134 and 136 are in communication with the inboard end of the slots 126 and 128, respectively. A back wall is formed at the inboard end of each of the slots 134 and 136, such as a back wall 138 illustrated in FIG. 10 with respect to slot 134. In addition, the slots 134 and 136 are formed at a slight angle with respect to a plane which is perpendicular to the axis of the coupling 116 such that the juncture of the slots 134 and 136 with the slots 126 and 128, respectively, are closer to the end face 130 than the inboard ends of the slots 134 and 136. Thus, the pairs of communicating slots 126 and 134, and 128 and 136, are generally in an L-shaped configuration, such as illustrated in FIG. 10. However, the legs of each L-shaped configuration which are formed by slots 134 and 136 are disposed at an angle slightly greater than ninety degrees from the other legs of each L-shaped configuration which are formed by slots 124 and 126, respectively.

As shown in FIG. 8, a bolt 140 is secured threadedly axially in a threaded hole (not shown) in the large diameter end 50 of the mandrel 20. An insert structure includes a pin 142 which is located in a head 144 of the bolt 140 with ends 143 and 145 of the pin extending as tabs from diametrically opposite sides of the head. As shown in FIG. 9, a face end 146 is formed with a hex shaped socket 148 to facilitate assembly of the bolt 140 with the mandrel 20.

As shown in. FIG. 12, the receptacle 48 includes a support 150 which is secured to column 34 (FIG. 3), or column 36, and extends laterally from one side thereof. The support 150 is formed with a stepped hole which defines a large hole 152 in axial communication with a smaller hole 154. A spring 156 is positioned in the smaller hole 154 and a sleeve 158, which is formed with an axial through hole 160, is positioned in the large hole 152. A spring-biased pin 162 is mounted radially in the support 150 and is formed with a tip 164 which is insertible into an annular groove 166 formed in the periphery of the sleeve 158. In this manner, the sleeve 158 is retained within the support 150.

Referring now to FIG. 13, mandrel 20 is positioned for assembly with apparatus 28 (FIG. 3) whereafter the small diameter end 52 of the mandrel 20 is moved into through hole 160 of receptacle 48 and into engagement with spring 156 which provides a resilient stop for end 52 to prevent damage to the end during assembly. Thereafter, the mandrel 20 is moved into axial alignment with the confining device 46 and the receptacle 48.

Ends 143 and 145 of pin 142 are aligned with axial slots 126 and 128, respectively. As shown in FIG. 14, the mandrel 20 is then moved axially to the left from the position shown in FIG. 13 to insert head 144 into opening 124 of the confining device 46. At the same time, ends 143 and 145 are moved into axial slots 126 and 128, respectively, to a position at the base of the axial slots whereby the ends are located in a plane which includes the entry portions of the lateral slots 134 and 136. As further illustrated in FIG. 14, the mandrel 20 is then rotated, as shown by the arrowheads with the circular lines, to position the ends 143 and 145 into the angled slots 134 and 136, respectively, and toward the back walls of the angled slots such as back wall 138 (FIG. 10). Referring now to FIG. 15, the drive shaft 112 is rotated as illustrated by the arrowhead whereby the ends 143 and 145 of pin 142 are urged fully, by the rotational action of the coupler 116, into engagement with the back walls of the angled slots 134 and 136. As the drive shaft 112 continues to rotate, the ends 143 and 145 and the pin 142 are rotated whereby the mandrel 20 is rotated in the direction of the three arrowheads which are illustrated in FIG. 15 as encircling the mandrel.

During the period when the mandrel 20 is being rotated in the manner described above, there is no gripping force applied to the large diameter end 50 of the mandrel and, therefore, there are no compressive or tensile forces applied to the large diameter end. Also, the small diameter end 52 of the mandrel 20 is situated and supported loosely in the through hole 160 of the receptacle 48 and is allowed to be rotated freely relative to the receptacle. Thus, there are no compressive or tensile forces being applied to the small diameter end 52 of the mandrel.

In the manner described above, the mandrel 20 is supported in place within apparatus 28 for the application of one or two of the strands 24 thereto as described above without the need of exerting any compressive or tensile forces on the mandrel during the strand-applying operation. This mode of support allows the mandrel 20 to rotate about its axis without any bowing which would normally be attributable to the mounting and support of the mandrel in the apparatus 28. Thus, any bowing of the mandrel 20 which might occur during a strand-application process is due solely to the application of the strands and the reverse pull or tension exerted on the mandrel through the strands.

The two-strand process, and the additional multiple-strand process noted above, provides a facility for balancing the forces applied to the mandrel 20 with the results noted above. The two-strand and additional-strand processes are enhanced by the manner of support of the mandrel 20 by the confining device 46 and the receptacle 48 as described above. With this enhancement, each of the opposite strands 24 needs to overcome and balance only the opposing force of the other strand on the opposite side of the mandrel 20 and does not have to contend with countering any mandrel-bowing compressive or tensile forces resulting from the manner in which the mandrel is mounted in the apparatus 28.

In like manner, the single-strand process is enhanced by the manner in which the mandrel 20 is mounted in the apparatus 28 by use of the confining device 46 and the receptacle 48

In addition to the foregoing advantages resulting from the non-compressive and non-tensile manner of mounting the mandrel 20, the loading and unloading of the mandrel relative to the apparatus 28 is simple and expeditious which results in an efficient process and increases the production rate.

In current use of the apparatus 28 with the ten sets of confining devices 46 and receptacles 48, the single-strand process is preferred.

In general, the above-described embodiments are not to be construed as limiting the breadth of the present invention. Modifications, and other alternative constructions, will be apparent which are within the spirit and scope of the invention as defined in the appended claims.

What is claimed is:

1. An apparatus for applying a pair of strands to a support having a normally linear axis extending between opposite ends thereof and mountable in the apparatus, which comprises:

a first guide structure for guiding a first strand of the pair of strands onto the support from a first direction;

a second guide structure for guiding a second strand of the pair of strands onto the support from a second direction;

enclosure structure for confining the first strand and the second strand at precise respective locations relative to the axis of the support to preclude movement of each of the first and second strands in a direction parallel to the axis of the support independent of the movement thereof associated with applying the strands to the support;

a first tension developing facility located for coupling to the first strand to develop a pulling force through the first strand when coupled thereto which tends to pull the support laterally of its axis in a direction opposite the first direction;

a second tension developing facility located for coupling to the second strand to develop a pulling force through the second strand when coupled thereto which tends to pull the support laterally of its axis in a direction opposite the second direction; and a frame structure for supporting the first guide structure and the second guide structure at locations relative to each other which allow the pulling forces of each of the first and second tension developing facilities to effectively cancel each other so that the support is precluded from movement lateral of its axis.

2. The apparatus as set forth in claim 1 wherein the first guide structure comprises:

a guide frame mounted on the frame structure, and an eyelet attached to the guide frame at a location adjacent the location where the support is to be mounted in the apparatus.

3. The apparatus as set forth in claim 2 wherein the eyelet is a first eyelet and wherein the second guide structure comprises;

a second eyelet attached to the guide frame at a location adjacent the location where the support is to be mounted in the apparatus; and wherein the first eyelet is positioned to guide the first strand onto the support from the first direction and the second eyelet is positioned to guide the second strand onto the support from the second direction with the first and second eyelets being on directly opposite of the axis of the support.

4. The apparatus as set forth in claim 3 which further comprises:

a first driving mechanism for rotating the support while the support is mounted in the apparatus; and a second driving mechanism for moving relatively the guide frame parallel to the axis of and adjacent the support to facilitate the application of the first and second strands to the support.

5. The apparatus as set forth in claim 1 wherein the second guide structure comprises:

a guide frame mounted on the frame structure, and an eyelet attached to the guide frame at a location adjacent the location where the support is to be mounted in the apparatus.

6. In an apparatus for mounting a support having an axis, which comprises:

a confining device having a coupling element formed with a slot configuration;

insert structure on a first portion of the support and extending angularly therefrom and positioned for assembly with the slot configuration of the confining device in a non-gripping manner; and a receptacle spaced from the confining device for receiving a second portion of the support spaced from the first portion thereof in a non-gripping manner.

7. In an apparatus for mounting a support having an axis, which comprises:

a confining structure;

insert structure on a first portion of the support including a tab extending laterally of the axis of the support and extending angularly therefrom and positioned for assembly with the confining device in a non-gripping manner; and a receptacle spaced from the confining device for receiving a second portion of the support spaced from the first portion thereof in a non-gripping manner.

8. The apparatus as set forth in claim 7 wherein the confining device comprises:

a coupling element formed in a front end face thereof with a first slot which is spaced from and parallel with the axis of the confining device;

the coupling element formed in an intermediate portion thereof with a second slot in communication with the first slot and generally laterally of the axis of the confining device; and the first and second slots being of sufficient size to receive the tab of the insert structure.

9. The apparatus as set forth in claim 8 wherein the second slot is formed at an angle beginning at its juncture with the first slot and angled toward a rear end face of the coupling.

10. A method of applying a pair of strands to a support having a normally linear axis, which comprises the steps of:

mounting the support for rotation;

attaching the leading ends of each of the pair of strands to a portion of the support;

rotating the support;

moving the strands along and parallel to the support while the support is being rotated to facilitate application of the strands onto the support;

confining each of the two pair of strands at precise respective locations relative to the axis of the support to preclude movement of the strands in a direction parallel to the axis of the support independent of the step of moving the strands to facilitate application of the strands onto the support;

applying a first strand of the pair of strands onto the support from a first direction;

developing a tension in the first strand which develops a pull force through the first strand and to the support;

applying a second strand of the pair of strands onto the support from a second direction; and developing a tension in the second strand which develops a pull force through the second strand and to the support which effectively cancels the pull force of the first strand so that the support is precluded from movement lateral of its axis.

11. A method of mounting in an apparatus a support having an axis, which comprises the steps of:

forming a tab on a first portion of the support extending at an angle from the axis of the support;

forming a first slot in one end of a coupler of a size which can receive the tab;

forming a second slot in a portion of the coupler of a size which can receive the tab wherein the second slot is in communication with the first slot and is formed at an angle with respect to the first slot;

positioning a second portion of the support, which is spaced from the first portion thereof, into an opening in a receptacle in a non-gripping manner;

positioning the tab into the first slot; and moving the tab from the first slot into the second slot whereby the tab and the adjacent portion of the support are confined in the coupler in a non-gripping manner.

12. The method of mounting as set forth in claim 11 wherein the second slot is formed at an angle with respect to the first slot which is greater than ninety degrees.

13. A method of applying strands to a support having a normally linear axis, which comprises the steps of:

forming a tab on the support extending at an angle from the axis of the support;

forming a first slot in one end of the coupler of a size which can receive the tab;

forming a second slot in a portion of the coupler of a size which can receive the tab and wherein the second slot is in communication with the first slot and is formed at an angle with respect to the first slot;

positioning a portion of the support spaced from the tab into an opening in a receptacle in a non-gripping manner;

position the tab into the first slot;

moving the tab from the first slot into the second slot whereby the tab and the adjacent portion of the support are confined in the coupler in a non-gripping manner;

attaching the leading ends of a pair of strands to a portion of the support;

rotating the support;

moving the strands along and parallel to the support while the support is being rotated to facilitate application of the strands onto the support;

applying a first strand of the pair of strands onto the support in a first direction;

developing a tension in the first strand which develops a pull force through the first strand and to the support;

applying a second strand of the pair of strands onto the support from a second direction; and developing a tension in the second strand which develops a pull force through the second strand and to the support which effectively cancels the pull force of the first strand so that the support is precluded from movement lateral of its axis.

14. The method of applying as set forth in claim 13 wherein the second slot is formed at an angle with respect to the first slot which is greater than ninety degrees.

15. The method as set forth in claim 13 wherein the second slot is formed with a first end which is in communication with the first slot and a second end which is at an end of the second slot opposite the first end thereof and which further comprises the step of urging the tab, as the coupler is rotated, into the end of the second slot.

16. A method of applying a strand to a support having a normally linear axis, which comprises the steps of:

forming a tab on the support extending at an angle from the axis of the support;

forming a first slot in a one end of a coupler of a size which can receive the tab;

forming a second slot in a portion of the coupler of a size which can receive the tab and wherein the second slot is in communication with the first slot and is formed at an angle with respect to the first slot;

positioning a portion of the support spaced from the tab into an opening in a receptacle in a non-gripping manner;

positioning the tab into the first slot;

moving the tab from the first slot into the second slot whereby the tab and the adjacent portion of the support are confined in the coupler in a non-gripping manner mounting the support for rotation;

attaching the leading end of a strand to a portion of the support;

rotating the coupler and thereby the support; and moving the strand along and parallel to the support while the support is being rotated to facilitate application of the strand onto the support.

17. The method of applying as set forth in claim 16 wherein the second slot is formed at an angle with respect to the first slot which is greater than ninety degrees.

18. The method as set forth in claim 16 wherein the second slot is formed with a first end which is in communication with the first slot and a second end which is at an end of the second slot opposite the first end thereof and which further comprises the step of urging the tab, as the coupler is rotated, into the end of the second slot.

* * * * *